Dec. 3, 1957     M. E. WEISS     2,815,430
ULTRASONIC SOLDERING IRON
Filed Feb. 28, 1956
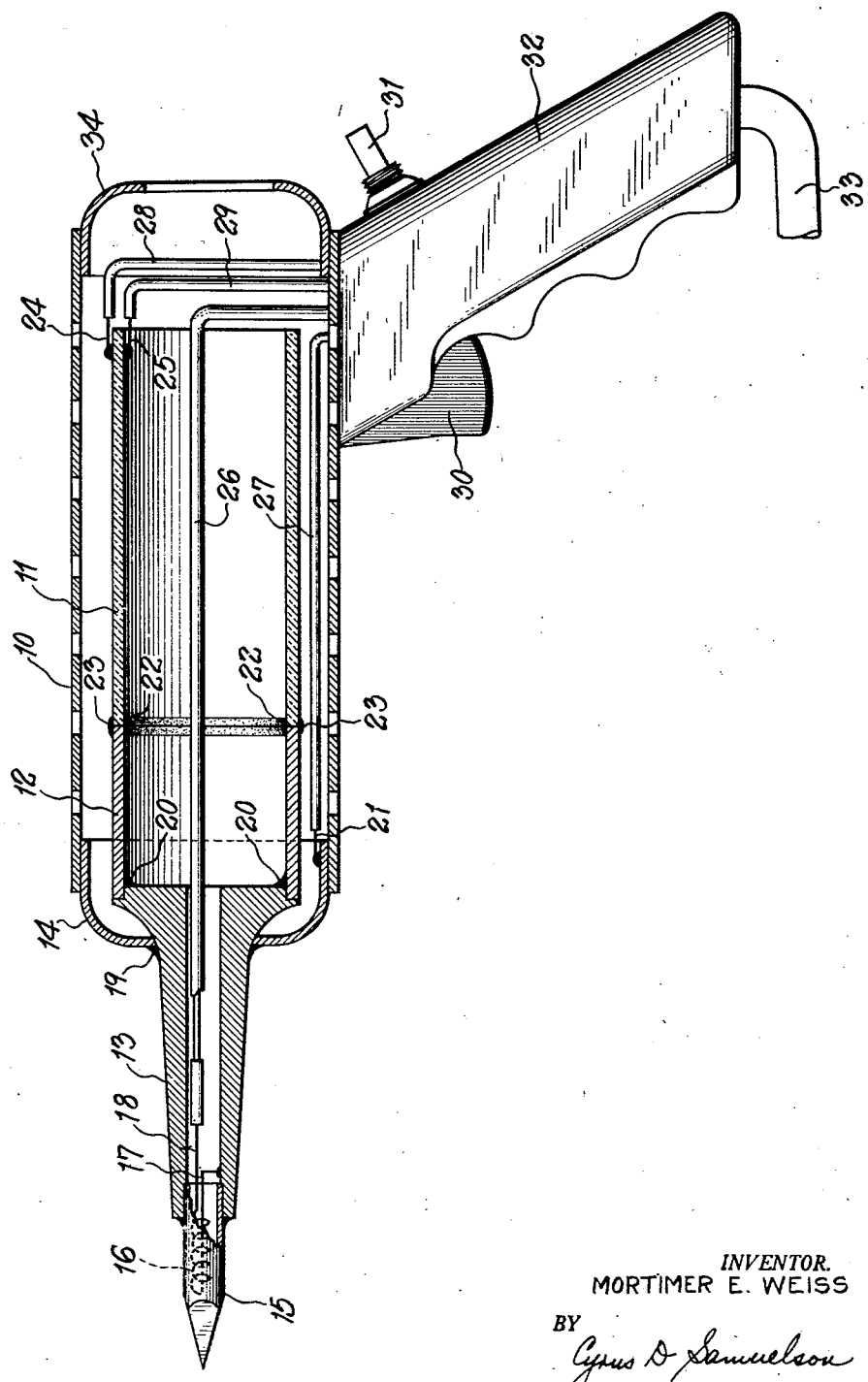
INVENTOR.
MORTIMER E. WEISS
BY
*Cyrus D. Samuelson*
ATTORNEY United States Patent Office 2,815,430
Patented Dec. 3, 1957

2,815,430

ULTRASONIC SOLDERING IRON

Mortimer E. Weiss, Flushing, N. Y., assignor to Gulton Industries, Inc., Metuchen, N. J., a corporation of New Jersey Application February 28, 1956, Serial No. 568,225

6 Claims. (Cl. 219—26)

My invention relates to ultrasonic soldering irons and in particular to those ultrasonic soldering irons which utilize electro-mechanical transducers to impart ultrasonic vibrations to either electrically heated or gas heated soldering tips.

It has been found that when the surfaces of metal are kept very clean and free from any oxide layer, the metals may be soldered without the use of fluxes or other special techniques. Up to now, this has been difficult to accomplish, particularly in the case of metals such as aluminum and magnesium. Use of ultrasonic vibrations has been made in order to break the oxide layers on these metals and to clean the metal surfaces, while simultaneously applying molten solder to the metal. The ultrasonic soldering iron of my invention may be utilized in conjunction with either a gas heated or an electrically heated tip so as to apply high heat and high ultrasonic energy to the solder and the metal being soldered.

Up to now, it has been difficult to keep the heat from the heated tip from being transmitted to the transducer. These transducers are usually adversely affected by excess heat so that it is important to keep the heat from being transmitted to the transducer. Various methods of heat insulation have been utilized but all of them have reduced the efficiency of the overall system due to increased weight, uncomfortable shapes or other disadvantageous conditions. My invention permits the utilization of higher soldering tip temperatures in conjunction with ultrasonic transducers with a minimum of heat transmission from the tip to the transducer.

Accordingly, it is a principal object of my invention to provide an ultrasonic soldering iron wherein there is a minimum of heat transmission from the soldering tip to the transducer.

It is a further object of my invention to provide an ultrasonic soldering iron which may be actuated by piezoelectric, electrostrictive or magnetostrictive means.

It is a still further object of my invention to provide an ultrasonic soldering iron which may be utilized with either electrically heated or gas heated soldering tips.

Other objects and advantages of my invention will be apparent during the course of the following description.

The accompanying drawing, forming a part of this application, is an elevational view, partly in cross-section, of a preferred embodiment of my invention.

The perforated metal housing is designated by 10 and the hollow cylindrical piezoelectric ceramic transducer is designated by 11. Transducer 11 is suitably cemented to velocity transformer 12 along inner joint 22 and outer joint 23. 12 is brazed to velocity transformer 13 along inner joint 20 and 13 is brazed to flange support 14 at the nodal surface 19. 12 and 13 together comprise a single velocity transformer; I have found it best to construct it in two sections in order to improve the thermal isolation. Soldering tip 15 is hollow and is suitably attached to 13. Electrical heating element 16 is contained within 15, lead 17 from 16 is electrically connected to 13 and lead 18 is carried through insulating element 26 through cable 33 to one side of a low-voltage transformer (not shown). Lead 21 serves as the electrical ground connection and is carried through insulating element 27 to become a part of cable 33. Electrical lead 24 makes electrical connection to the outer surface of 11 and is carried to cable 33 through insulating element 28 and electrical lead 25 makes electrical connection to the inner surface of 11 and is carried to cable 33 through insulating element 29. Switches 30 and 31 are mounted on handle 32; 30 serves to apply electricity to heating element 16 and 31 serves to apply ultrasonic energy to transducer 11. End cap 34 is suitably attached to 10 and serves to enclose the unit.

Cable 33 carries all the necessary electrical connections from the power supply and the ultrasonic generator (not shown). The ultrasonic generator is utilized to excite transducer 11 through electrical leads 24 and 25. The output of the ultrasonic generator is controlled by switch 31 in handle 32. I have shown transducer 11 as a polarized electrostrictive hollow cylinder formed principally of barium titanate but the transducer may be made of any other type such as piezoelectric or magnetostrictive and may be of any suitable shape.

Transducer 11 is suitably affixed to velocity transformer 12 along both the inner and outer joints 22 and 23 by means of a high strength thermo-setting plastic adhesive having a very low compliance and an acoustic impedance which matches that of transducer 11. The long cylindrical shape of 12 provides sufficient radial compliance so that any radial vibration of transducer 11 will not affect the bonds at 22 and 23.

Velocity transformer 13 works in conjunction with 12 and is brazed to 12 along the inner joint 20. The combination 12—13 serves as the velocity transformer to transmit longitudinal ultrasonic vibrations from 11 to soldering tip 15. 13 is supported at the nodal surface 19 and is brazed to flange support 14. Flange support 14 serves two purposes: first, it supports 13 at its nodal surface; and second, it acts as a heat sink or low thermal impedance to shunt the heat from 15 away from 11. 14 is solidly connected to 10 so that 13 is, in effect, supported by 10 and the heat is dissipated over the complete surface of 10.

Low thermal conductivity materials such as Invar, Inconel, 52 alloy (52% iron–48% nickel) and some of the high chrome stainless steels may be employed for velocity transformers 12 and 13. The total length of 12—13 is determined, in the main, by the velocity of sound in the material used and the frequency of the ultrasound. I have found the frequencies between 18 and 30 kilocycles to be very effective for ultrasonic soldering with ultrasonic soldering irons of my invention; although, I have also obtained satisfactory results at frequencies above 30 kilocycles. The velocity at the soldering tip is equal to the velocity of the transducer multiplied by the quotient of the diameter of the velocity transformer at the transducer divided by the diameter of the velocity transformer at the soldering tip.

High thermal conductivity materials such as brass, bronze or aluminum may be used for flange support 14, perforated housing 10 and end cap 34.

Soldering tip 15 is hollow and is heated by means of heating coil 16 which is secured inside 15 with a ceramic sealing support such as sodium silicate and alumina. The ceramic sealing support serves two purposes: first, to secure 16 inside 15; and second, to insulate 16 from 15. 16 is formed, preferably of heavy Nichrome wire. Lead 17 from 16 is brazed to 13 or 15 and serves as the grounded connection which is carried back to 33 through 14, 10 and lead 21. Lead 18, which is the high side of 16 is carried back to 33 through insulating sleeve 26 and thence to the high side of a low voltage transformer (not shown). The flow of electricity to 16 is controlled by switch 30.

Ultrasonic soldering irons, embodying the teaching of my invention, may also be employed with gas-heated tips. When gas heating is used, tip 15 is fashioned of a solid piece of metal and the complete unit is mounted on a self-contained fuel tank (not shown) with the burner placed adjacent to the soldering tip so that both the work and the soldering tip are heated by the gas flame.

Ultrasonic soldering irons of my invention may also be employed in continuous service such as on automatic soldering machinery. In such service, it is necessary to provide cooling means similar to that described by me in my copending application Serial No. 535,677 in place of perforated metal housing 10.

While I have described my invention by means of specific examples and in a specific embodiment, I do not wish to be limited thereto, for obvious modifications will occur to those skilled in the art without departing from the spirit of my invention or the scope of the subjoined claims.

Having thus described my invention, I claim:

1. An ultrasonic soldering iron comprising an electromechanical transducer; a velocity transformer affixed to said transducer; said velocity transformer having its largest diameter at said transducer end and having its smallest diameter at its other end; said velocity transformer comprising two sections suitably joined together, the section adjacent said transducer being of uniform cross-sectional dimensions, the other of said sections being tapered from cross-sectional dimensions equal to those of said section adjacent said transducer to smaller dimensions at the end adjacent said soldering tip; a soldering tip affixed to said velocity transformer at its small end; means for supporting said velocity transformer at its nodal surface; means for electrically exciting said electro-mechanical transducer and means for heating said soldering tip.

2. An ultrasonic soldering iron as described in claim 1 wherein said means for heating said soldering tip comprises an electrical heating element within said soldering tip.

3. An ultrasonic soldering iron as described in claim 1 wherein the portion of said velocity transformer, adjacent said electro-mechanical transducer is hollow and of substantially uniform cross-section.

4. An ultrasonic soldering iron as described in claim 1 wherein said means for supporting said velocity transformer comprises a material of high thermal conductivity.

5. An ultrasonic soldering iron as described in claim 1 wherein said electro-mechanical transducer is a polarized electrostrictive material.

6. An ultrasonic soldering iron as described in claim 1 wherein said electro-mechanical transducer is composed largely of barium titanate.

References Cited in the file of this patent

UNITED STATES PATENTS

| | | |
|---|---|---|
| 2,397,400 | Barwich | Mar. 26, 1946 |
| 2,676,236 | Birkbeck et al. | Apr. 20, 1954 |

FOREIGN PATENTS

| | | |
|---|---|---|
| 658,922 | Great Britain | Oct. 17, 1951 |
| 713,566 | Great Britain | Aug. 11, 1954 |
| 814,765 | Germany | Sept. 24, 1951 |

OTHER REFERENCES

Crawford: "Ultrasonic Tinning Techniques for Aluminum," Electronics, December 1952, pp. 103–105 (p. 103 cited).

Wise et al.: "Putting Ultrasonics To Work," Product Engineering, August 1952, pp. 180–185 (p. 181 cited).